(12) United States Patent
Gagnon-Kvale et al.

(10) Patent No.: US 12,160,484 B2
(45) Date of Patent: *Dec. 3, 2024

(54) VARIABLE CONTENT GENERATION AND ENGAGEMENT TRACKING

(71) Applicant: Salesforce, Inc., San Francisco, CA (US)

(72) Inventors: Shacarah Gagnon-Kvale, Duluth, MN (US); Samuel Winton Whitmore, Portland, OR (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/454,032

(22) Filed: Nov. 8, 2021

(65) Prior Publication Data

US 2022/0060552 A1    Feb. 24, 2022

Related U.S. Application Data

(63) Continuation of application No. 16/263,095, filed on Jan. 31, 2019, now Pat. No. 11,184,450.

(51) Int. Cl.
*H04L 67/50* (2022.01)
*G06Q 10/0631* (2023.01)
*G06Q 10/0639* (2023.01)
*G06Q 10/107* (2023.01)

(52) U.S. Cl.
CPC ...... *H04L 67/535* (2022.05); *G06Q 10/06311* (2013.01); *G06Q 10/0639* (2013.01); *G06Q 10/107* (2013.01)

(58) Field of Classification Search
CPC ............................ H04L 67/22; G06Q 10/107; G06Q 10/06311; G06Q 10/0639
See application file for complete search history.

(56) References Cited

U.S. PATENT DOCUMENTS

| | | | |
|---|---|---|---|
| 2007/0244739 A1* | 10/2007 | Soito | G06Q 30/0201 705/7.29 |
| 2009/0083631 A1* | 3/2009 | Sidi | H04N 21/4667 715/721 |
| 2011/0022637 A1* | 1/2011 | Khader | G06Q 10/06 707/793 |
| 2014/0115039 A1* | 4/2014 | Dixon | G06Q 30/02 709/203 |
| 2015/0007065 A1* | 1/2015 | Krishnamoorthy | G06F 3/0483 715/760 |

(Continued)

*Primary Examiner* — Hee Soo Kim
(74) *Attorney, Agent, or Firm* — Holland & Hart LLP

(57) ABSTRACT

A communication server supports automatic content receipt and distribution. The communication server receives a set of content objects, where a content object of the set is associated with a set of target group identifiers. A content object of the set may include different versions of content for ABn and/or multivariate testing. The communication server generates target segment identifier combinations and distributes versions of messages proportionally to each user identifier associated with the target segment combinations. The server generates engagement metrics corresponding to interaction by the user identifiers with the messages. The metrics may be generated for each message version, each group of users, and each group combination.

20 Claims, 11 Drawing Sheets

(56) References Cited

U.S. PATENT DOCUMENTS

| | | | |
|---|---|---|---|
| 2015/0074650 A1* | 3/2015 | Bennett | G06F 11/3688 |
| | | | 717/125 |
| 2016/0063560 A1* | 3/2016 | Hameed | G06Q 30/0264 |
| | | | 705/14.61 |
| 2016/0253683 A1* | 9/2016 | Gui | G06Q 50/01 |
| | | | 705/7.32 |
| 2016/0275572 A1* | 9/2016 | Omachi | G06Q 30/0277 |
| 2018/0219808 A1* | 8/2018 | Wala | H04L 51/234 |
| 2018/0292890 A1* | 10/2018 | Swanson | G06F 3/0346 |
| 2019/0156359 A1* | 5/2019 | Sinha | G06Q 30/0204 |
| 2020/0034882 A1* | 1/2020 | Deng | G06Q 30/0244 |
| 2020/0104396 A1* | 4/2020 | Ivaniuk | G06F 11/076 |
| 2020/0211035 A1* | 7/2020 | Bluming | H04L 67/22 |
| 2020/0327577 A1* | 10/2020 | Truong | G06Q 30/0244 |

* cited by examiner

VARIABLE CONTENT GENERATION AND ENGAGEMENT TRACKING

CROSS REFERENCES

The present Application for Patent is a continuation of U.S. patent application Ser. No. 16/263,095 by Gagnon-Kvale et al., entitled "VARIABLE CONTENT GENERATION AND ENGAGEMENT TRACKING," filed Jan. 31, 2019; assigned to the assignee hereof and expressly incorporated by reference herein.

FIELD OF TECHNOLOGY

The present disclosure relates generally to database systems and data processing, and more specifically to variable content generation and engagement tracking.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support user interaction analytics, in which various digital communications, including emails, notifications, advertisements, web pages, etc. may be tracked according to user interaction. Some platforms may not include a robust collection of categorized users and a technique to track various versions of content. Further, a content creator, manager, and a developer are required to work together to create trackable digital communications that may be distributed to users. The cloud platform may lack the capability to track interactions as the interaction relates to different categories or combinations of users and/or combinations of content included in the digital communications.

DETAILED DESCRIPTION

Figure 1:
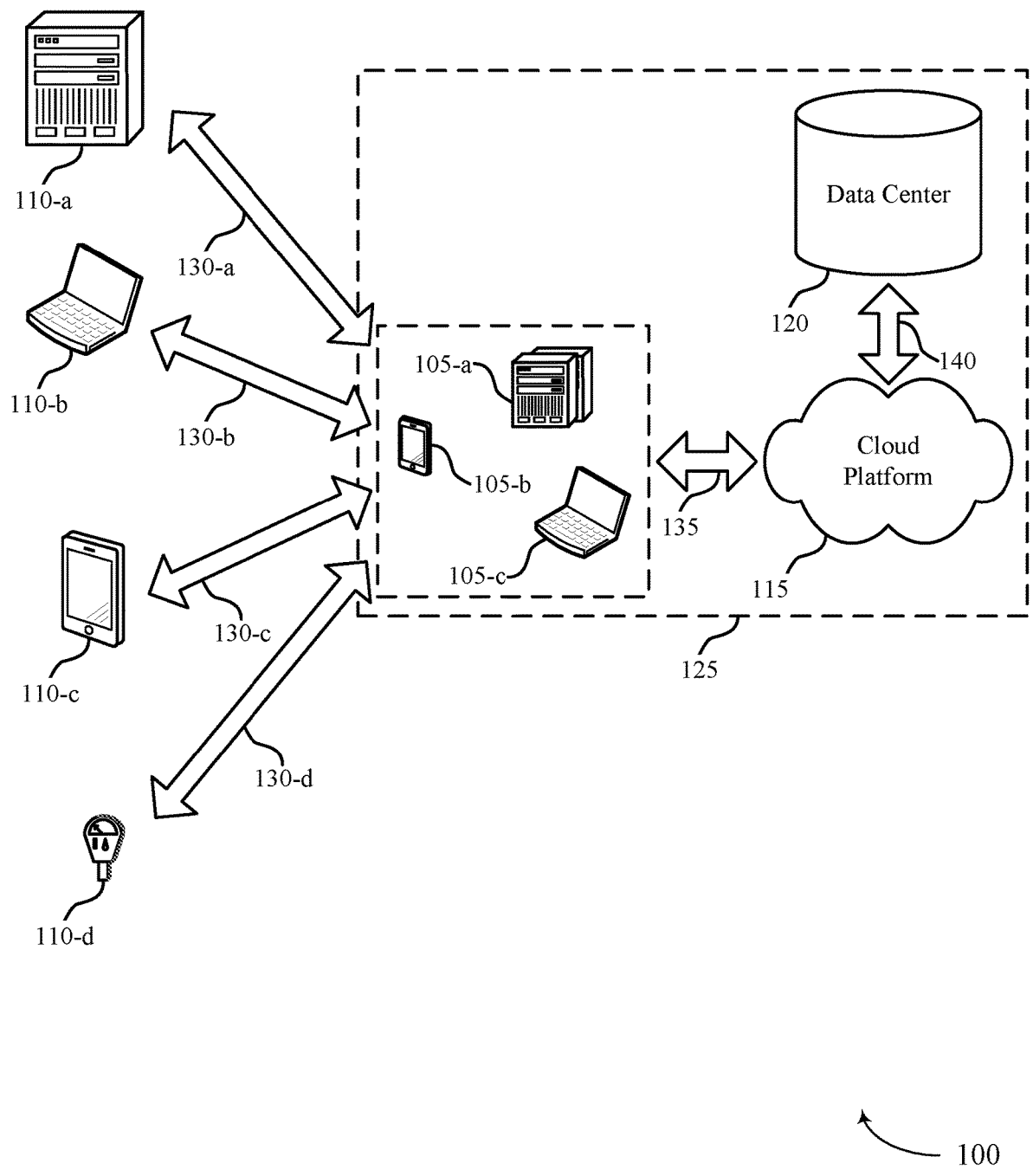
FIG. 1 illustrates an example of a system for data processing that supports variable content generation and engagement tracking in accordance with aspects of the present disclosure.

A communication engine of a server supports receipt of a set of content objects for inclusion in a communication message distribution. In some cases, the communication messages are emails, push notifications, web-pages, advertisements, etc. Based on various data included in the communication message and various user data maintained by the communication engine, the communication engine may automatically identify groups of users to receive the message, generate and distribute communication messages to users, and track the engagement metrics associated with the users.

The communication engine receives the set of content objects, which may include various content data defining content including a subject line, a preheader, images, alignment, buttons, colors, links, copy, etc. In some cases, the set of content object includes different versions of content data for ABn and/or multivariate testing. Furthermore, the set of content objects may be associated with target group identifiers, which correspond to groups of users which are directed to receive the content in a communication message. The communication engine maintains a collection of users and associated groups (e.g., categories). For example, the categories may indicate whether the user is a prospect or customer, whether the user is associated with a small, medium, or large business, whether the user is interested in a particular product, etc. Based on the received set of data objects, the communication engine may automatically identify users, distribute versions of content to the users, and track feedback associated with the different groups and group combinations of users.

The communication engine uses group identifiers associated with content objects and group identifiers associated with users to automatically identify users to receive the communication messages. The communication engine may create group combinations and distribute different versions of messages proportionally to group combinations. The distribution technique provides for feedback tracking with high granularity and further provides for different groups and group combinations of users to be tracked according to different pieces of content.

The communication engine message distribution technique further provides for combinations of ABn and multivariate testing. For example, many different versions of a subject line may be tracked (e.g., ABn testing) and many different versions of many pieces of content may be tracked, such as multiple versions of a subject line and multiple versions of an image (e.g., multivariate testing). The communication engine provides for simultaneous or contemporaneous ABn and multivariate testing across many different groups (e.g., categories or segments) of users and segment combinations of users. For example, the communication engine may automatically distribute multiple versions of a subject line and multiple versions of an image within an email to proportional segments of users that are interested in one of two particular products and are categorized as being associated with a small business. The communication engine proportionally distributes the version combinations of subject lines and images in emails to the combinations of users, such that user interaction may be tracked in a meaningful manner.

Aspects of the disclosure are initially described in the context of an environment supporting an on-demand database service. Aspects of the disclosure are further described in the context of a block diagram illustrating system, a block diagram illustrating a server, and a process flow. Aspects of the disclosure are further illustrated by and described with reference to apparatus diagrams, system diagrams, and flowcharts that relate to variable content generation and engagement tracking.

FIG. 1 illustrates an example of a system 100 for cloud computing that supports variable content generation and engagement tracking in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Subsystem 125 may support a communication server that utilizes the data center 120 and/or the cloud platform to distribute communication messages and track feedback associated with the communication messages. A cloud client 105 may utilize the communication server to enter content for communication message distribution and track user feedback (e.g., interactions 130 by contacts 110) with the messages. The server may include collection of user identifiers (e.g., contact 110 identifiers stored at the data center 120), which may be categorized based on associated group identifiers. The communication server supports automatic distribution of content and content versions based on the number of content objects included in a content package, as well as the number of target groups of users.

Conventional communication techniques may not distribute content to targeted users such that user interaction may be tracked in a meaningful manner. This may be due to the fact that these systems do not include a robust collection of user data, in which users are classified to various categories. Further, these systems may not provide for receipt of content data targeted for various users and automatic distribution of such data, including content variations, to users such that the interaction can be tracked across various user categories.

The communication server of subsystem 125 solves these problems by providing techniques for receiving content targeted to various groups of users, identifying users from a user collection that match the target indications based on target group identifiers, and automatically and proportionally distributes content across groups of users and group combinations, while distributing different content versions for ABn and multivariate testing. The communication server may receive a payload including a set of content objects, where each content object may include a set of a content data. The set of content data may include subject lines, images, links, copy, preheaders, etc. that may be distributed in various communication forms. A set of group identifiers may be associated with one or more of the content objects. The group identifiers correspond to target groups of the user collection. Each user may be associated with one group per group class. For example, a user may be associated with a small business of the business size class. These associations may be based on browsing data associated with the user, inputs by the users, user purchase or interaction history, etc., which may be referred to as attribute data. The communication system maintains and updates the collection based on such attribute data.

The communication server utilizes the group identifiers associated with the content to identify users associated with the corresponding groups in the user collection. To identify such users, and to evenly distribute messages such that the interaction data may be meaningfully tracked, the server generates a set of group identifier combinations using the group identifiers associated with the content. For example, if the content is targeted to groups A1, A2, B1, B2, B3, C1, where the letter corresponds to a class (e.g., business size) and the numbers following correspond to the group within the class (e.g., small, medium, or large business), the server generates a set of group combinations (e.g., [A1, B1, C1], [A1, B2, C1], [A2, B1, C1], etc.). If a user is associated with one of the group combinations (e.g., [A1, B1, C2]) then the user may receive at least a version of a communication message associated with the content. This process allows for the content interaction to be tracked across each group (e.g., any user associated with group A1), as well as the content interaction corresponding to group combinations (e.g., users associated with groups B3 and C1).

Further, if the set of content objects includes a content object with multiple versions of content data (e.g., three different subject lines) for AB or ABn testing, then the server evenly or proportionally distributes the content within each group combination. For example, if thirty (30) users are associated with group identifier combination [A1, B2, C1], then the server may distribute a first version of the subject line to ten (10) users, the second version of the subject line to another 10 users, and the third version of the subject line to another 10 users. The server may perform this segmentation or splitting across each group combination. As a result, the different versions may be tested for each group and group combinations. The server further distributes the content within each group if the set of content objects include multiple items of content data with multiple versions (e.g., multiple subject lines and multiple images or multivariate testing).

The communication server may utilize a message object for message distribution on the fly. The server may select content and populate the message object with the selected content as the server distributes the messages to the users. This allows for content to be stored separately from a populated message. Thus, the server may identify content based on various factors, identify users to receive the content, and efficiently generate and distribute messages using the message object.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As an example utilization of the subsystem 125, a content or marketing manager of a cloud client 105 may create a set of content objects. Each content object may include various content data including at least a subject line and an image, where each content object is targeted to a different group of customers. Each content object may include multiple versions of the subject line and multiple versions of the image. The content data may be input into a user interface (UI) provided by the communication server or a separate server. Target group identifiers are associated with the content object based on the user input. The communication server receives the content objects and stores the content in a content database with associated target group identifiers. When the content is "live" or designated for distribution, the communication server identifies users, segments users based on the combinations of target groups identifiers, and distributes the different versions of content in communication messages. The communication server receives feedback and generates engagement metrics based on the feedback. The marketing manager may view these metrics to identify the relative success or failures of the content across groups and group combinations of users for future utilization of the content.

Figure 2:
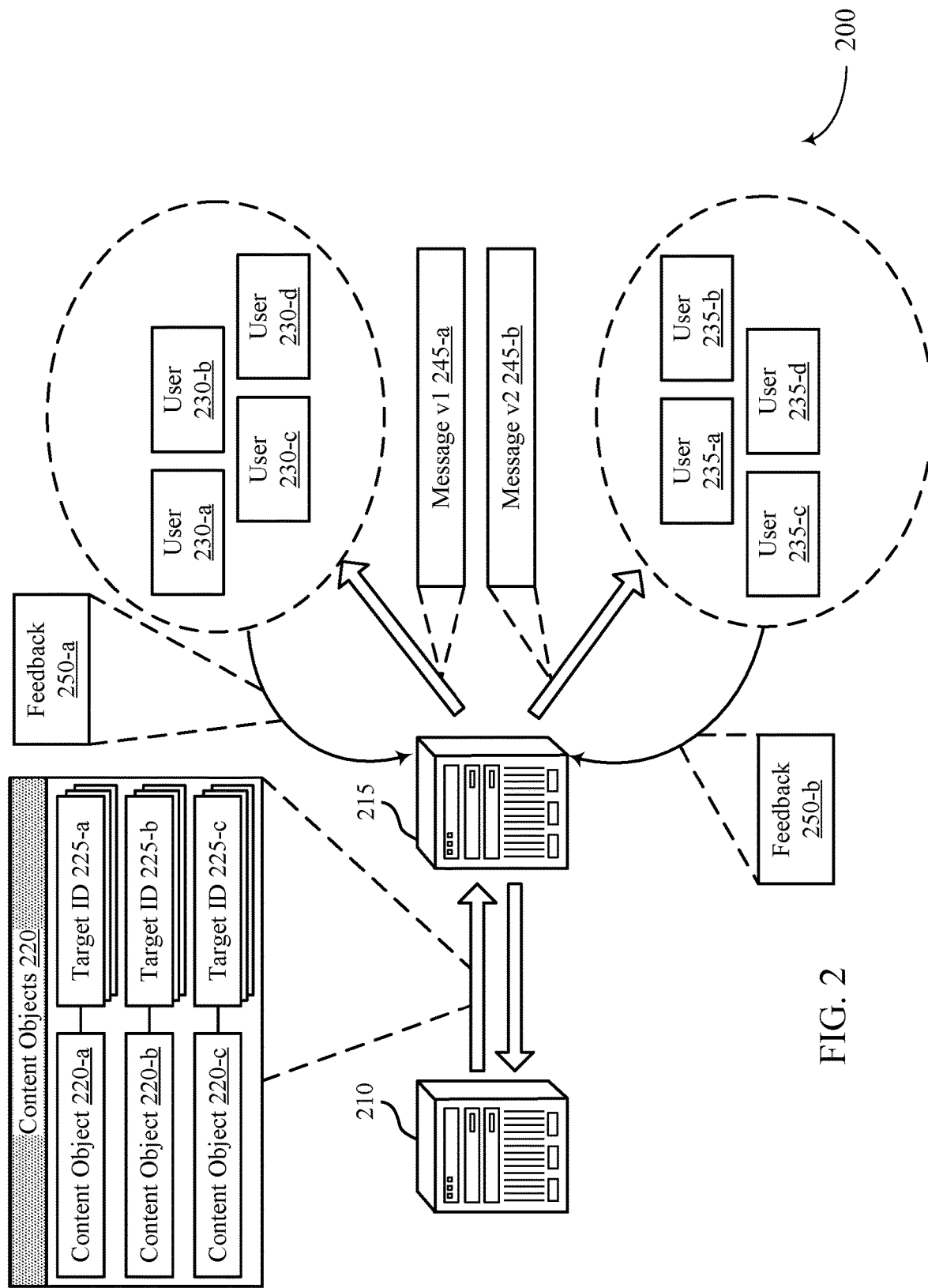
FIG. 2 illustrates an example of a block diagram of a system that supports variable content generation and engagement tracking in accordance with aspects of the present disclosure.

FIG. 2 illustrates an example of a block diagram of a system 200 that supports variable content generation and engagement tracking in accordance with aspects of the present disclosure. The system 200 includes first server 210 and a second server 215, which may correspond to various components of the subsystem 125 of FIG. 1, including the data center 120 and cloud platform 115. The first server 210 may be an example of a content management server, and the second server 215 may be an example of a communication server. The second server 215 receives a set of content objects 220 from the first server 210. In some cases, the set of content objects 220 is included in a payload generated by the first server 210 based on input received at a UI from a user. In some cases, the communication server 215 may support a UI for receiving content and content objects 220. Each content object 220 may include a set of content data that may correspond to attributes for a communication message. The attributes may include subject lines, preheaders, images, alignments, buttons, colors, links, images, copy, or a combination of these or similar aspects of a communication message.

Each content object is associated with a set of target identifiers 225. The target identifiers may be generated by the first server 210 and/or the communication server 215 based on input by the user. Such input may include a selection of target users for receipt of the content of the content objects 220. For example, content object 220-a includes a target group identifier set corresponding to users interested in a particular product, to users associated with a particular business size, to users that are classified as a customer or prospect, etc. Thus, a user may configure certain content objects 220 for different users or groups of users. In some cases, one or more of the content objects 220 may include different versions of a piece of content data (e.g., multiple versions of copy, subject line, image, etc.).

The second server 215 may receive the set of content objects 220 and store the content objects 220 in a content datastore. The second server 215 may execute a distribution process, which indicates a distribution schedule for various content objects 220, content type, content "freshness" (e.g., how recent the content has been distributed), user groups, etc. The second server 215 may also store one or more message objects, which may be populated with content data or content objects 220 upon message distribution. Based on various factors as described, the communication server may select a content object 220 or set of content objects 220 for distribution. Using the target identifiers 225 associated with the content object, the communication server performs a user identification process for selecting users for receiving messages including the selected content objects 220. The user identification process may include generating a set of group identifier combinations using the target group identifiers 225 associated with the selected content object 220. For example, if the content is targeted to groups A1, A2, B1, B2, B3, C1, where the letter corresponds to a class (e.g., business size) and the numbers following correspond to the group within the class (e.g., small, medium, or large business), the server 215 generates a set of group combinations (e.g., [A1, B1, C1], [A1, B2, C1], [A2, B1, C1], etc.) where each combination includes one group identifier per class.

Each combination corresponds to a set of user identifiers in the user collection. For example, 1,000 users may be associated with the group combination [A2, B1, C1] based on user attributes corresponding to the users. Such attributes may be based on user input (e.g., inputting interests at a user interface, purchase history, communication history, web-browsing history, etc.). A user may be a member of one group per group class (e.g., small, medium, or large business in the business size class). The users may be a subscriber to a service based on, for example, an email distribution sign-up, an application or software purchase or download, etc.

The second server 215 may further portion the set of user identifiers associated with each group combination based on the number of message versions to be distributed. For example, if a set of content objects include two versions of a subject line and two versions of an image, then users of each group combination may be split into four proportional sub-groups where each sub-group receives a different combination of versions (e.g., [subject line 1, image 1], [subject line 1, image 2], [subject line 2, image 1], and [subject line 2, image 2]). The second server may then generate and distribute messages on the fly using the group combinations, sub-group distributions, and message object, and content objects 220.

As an example illustrated in FIG. 2, the content object 220-a may include two subject line versions and may be targeted to various target groups that include at least a set of users 230 and 235. The set of users 230 and 235 may correspond to a target segment combination generated by the second server 215 (e.g., [A1, B2, C1]). Because the content object 220-a includes two subject line versions, the second server 215 distributes a first version of a message 245-a including in the first version of the subject line to users 230 (e.g., a first half of the users associated with the combination [A1, B2, C1]) and a second version of a message 245-b including the first version of the subject line to users 235 (e.g., a second half of the users associated with the combination [A1, B2, C1]). The second server 215 may perform such splitting for each group combination. In some cases, the messages 245 are not distributed to every user associated with the combination. For example, the server 215 may not select or deselect a user for a message distribution based on the user having received a message recently or frequently. Accordingly, the second server 215 may split a subset of the users associated with a particular group combination.

The second server 215 may monitor feedback 250 associated with the message distribution. The feedback 250-a corresponds to user interaction (e.g., open, click, unsubscribe) with the first version of the message 234, and the feedback 250-b corresponds to user interaction with the second version of the message 245-b. Because of the manner of distribution, engagement metrics (e.g., click rate, open rate, click to open rate) may be generated for each target group and group combination, and for each version of the message 245 across the groups and group combinations. Accordingly, the second server 215 provides metrics with high granularity and usability, and ABn testing may be automatically performed for various versions of content data. Further, each piece of content data may be assigned a unique content identifier. When the engagement metrics are associated with the unique content identifiers associated with content included in various different messages, the content may be tracked across various different uses of the content (e.g., within different versions of a message, across different message distributions, timings, etc.).

Figure 3:
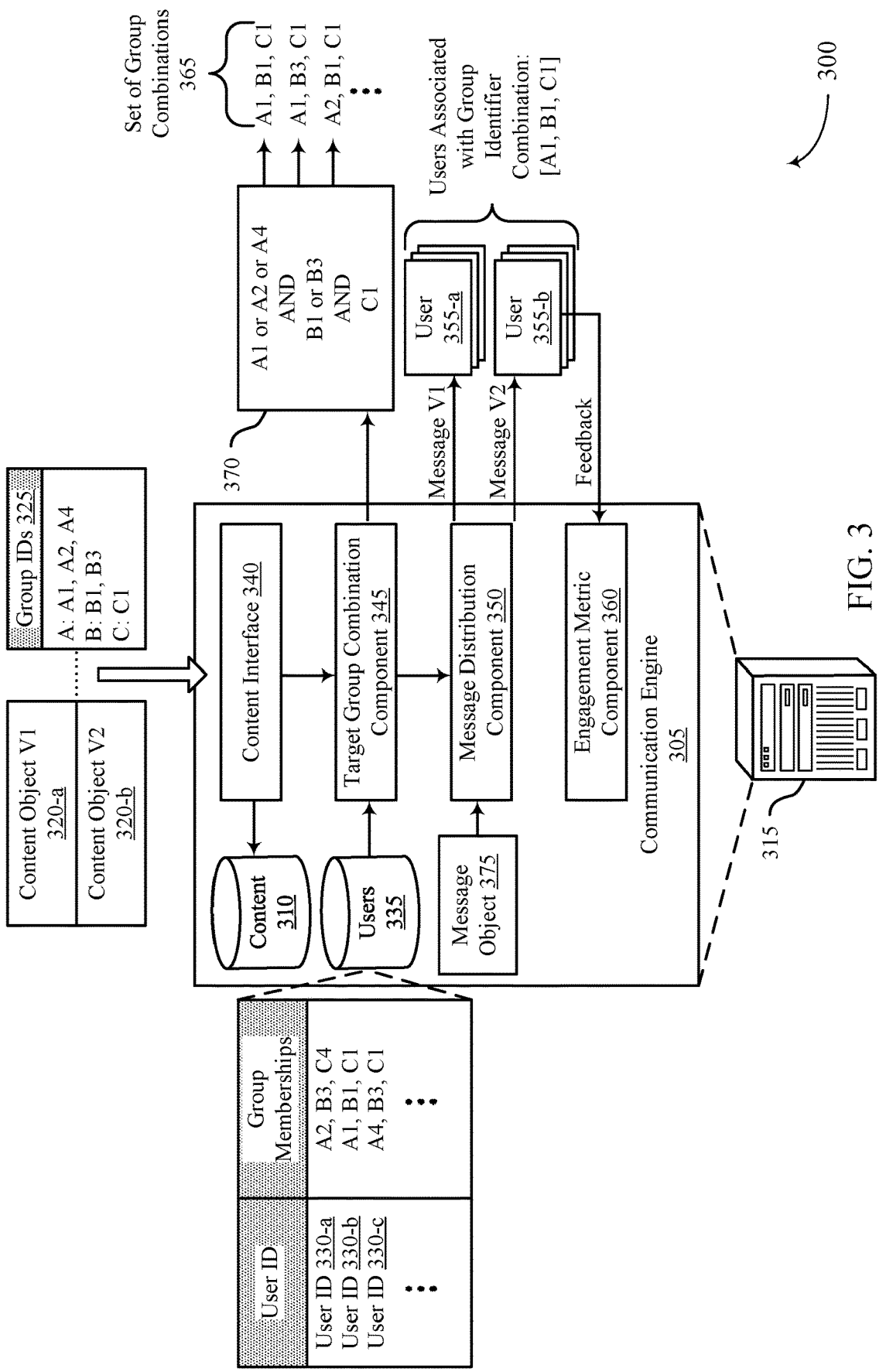
FIG. 3 illustrates an example of a block diagram of a server that supports variable content generation and engagement tracking in accordance with aspects of the present disclosure.

FIG. 3 illustrates an example of a block diagram of a server 300 that supports variable content generation and engagement tracking in accordance with aspects of the present disclosure. The server 300 may be a communication server and may be an example of the second server 215 of FIG. 2. The server 300 executes a communication engine 305 for content selection, message distribution, and feedback tracking. The communication engine 305 includes a content interface 340. In some cases, the content interface 340 receives a set of content objects 320 from another server (e.g., a content management server or the first server 210 of FIG. 2). In other cases, the content interface 340 supports a user interface for receiving the set of content objects 320, where the content is input by a user. The set of content objects 320 is associated with a set of group identifiers 325. The content interface 340 receives the set of content objects 320 and stores the content of the set of content objects in a content datastore 310 for subsequent distribution. The set of content objects 320 may include a first version of a content object 320-a including a first version of content data (e.g., first image) and a second version of the content object 320-b including a second version of the content data (e.g., a second image).

When designated for or prior to distribution, a target group combination component 345 of the communication engine 305 identifies a set of group identifier combinations 365. In some cases, the set of group combinations 356 is identified using the process 370. As illustrated, the set of content objects 320 is associated with target group identifiers A1, A2, A4, from target group class A; target group identifiers B1 and B3 from target group class B; and target group identifier C1 from target group class C. Each combination may include one target group identifier per class, so the process designates combinations by:
[(A1 or A2 or A4) and (B1 or B3) and (C1)]
which is based on the target identifiers associated with the content object. In some cases, the set of group identifier combinations 365 includes all possible combinations of identifiers (e.g., subject to the limitation of one identifier per class). The users associated with each combination may be identified from a user collection stored in a user datastore 335. As illustrated, each user identifier 330-a may be associated with a set of groups (e.g., members of the groups) based on group identifier associations.

A message distribution component 350 of the communication engine may generate and distribute messages to various users 355 based on the group identifier combinations and message versions. Because the set of content objects 320 includes two versions, the message distribution component 350 splits the users associated with the combination [A1, B1, C1] into the portions: users 355-*a* and users 355-*b*. It should be understood that more than two portions may be generated based on the number of versions (e.g., three images) and version combinations (e.g., three images and two subject lines). Different message versions are distributed to each of the portions (e.g., users 355-*a* and 355-*b*) by populating the corresponding content from the content datastore 310 into a message object 375. The message object 375 may define various global attributes of a message, such as background, HTML tags, etc.

An engagement metric component 360 receives feedback corresponding to the message distribution and generates engagement metrics. The engagement metrics may correspond to different versions and group combinations of the set of group identifier combinations 365. Because the group combinations and version distribution, the different message versions may be tracked according to different groups and group combinations. Further, the different content data may be associated with unique content identifiers, and the engagement metrics may be linked to the unique content identifiers for tracking engagement with various content included in different message distributions and versions. Furthermore, a common task identifier may be associated with the set of content objects 320, each individual content object 320, and/or the content data within the content objects. The common task identifier may be used by an organization (e.g., cloud client 105) to track various communication tasks (e.g., marketing campaigns) across the organization as a whole. For example, a common task identifier may be associated with each communication corresponding to a particular product, and the common task identifier may be utilized to track relative success or failure of the product marketing campaigns. Accordingly, the generated set of engagement metrics may be associated with the common task identifier.

The communication engine 305 may support maintaining the user datastore 335 and the content datastore 310. The communication engine 305 may include a persona engine, which may assign a persona record to a subscriber record (e.g., a user identifier), which may represent a prospect, customer, or other type of entity. A persona record may represent certain target groups such as a user associated sales department, a marketing department, an information technology (IT) department, or various other type of department. The persona records may be assigned based on the subscriber being associated with a prospect or customer based on an account type field in the subscriber record, based on a product interest field, job function, whether the subscriber owns a product, etc. The persona records may correspond to a target segment identifier included with various content objects. The communication engine 305 may assign various scores to subscribers, rank subscribers, etc.

The communication engine 305 may further include a scoring engine, which may assign scores to content items (e.g., content data, sets of content data, content objects 320) based on performance data (e.g., engagement data), which is determined based on communication feedback. A content item may be an offer item (e.g., a proposal to a customer to buy a product or service). The content scores may be assigned and recalculated at periodic intervals, during a maintenance automation, or at various other times. In some cases, the scores may be assigned to content after the content has been transmitted a threshold number of times. The scoring engine may rank filter, identify high performing or low performing content, etc. based on the scores, and in some cases, the scoring engine weights and normalizes various scores.

Using the scored subscribers and persona records associated with subscribers, the communication engine 305 may assign content items to user identifiers based on the scores associated with the content items. In some cases, the communication engine 305 considers whether the content has been viewed by certain users, the period of time since last viewing, etc. Thus, the communication engine 305 may track view counts and last view dates. In some cases, the communication engine 305 utilizes content items in a content pool, which may be ranked based on various factors (scoring, time since last transmission of the content, etc.). The communication engine 305 may consider various rules when assigning content from the pool to users. The content pool may be used to identify a set of related content (e.g., for particular personas), and then assign the content to various users. The pool may be updated based on various factors, flags associated with the content, etc.

When considering whether to assign content to a particular subscriber, the communication engine 305 may consider the segment identifier associated with the content, personas and other identifiers associated with the subscribers. Thus, the communication engine 305 matches the subscribers to the content based on the identifiers, scores, etc. The communication engine 305 may continuously or periodically update scores, metrics. etc.

Figure 4:
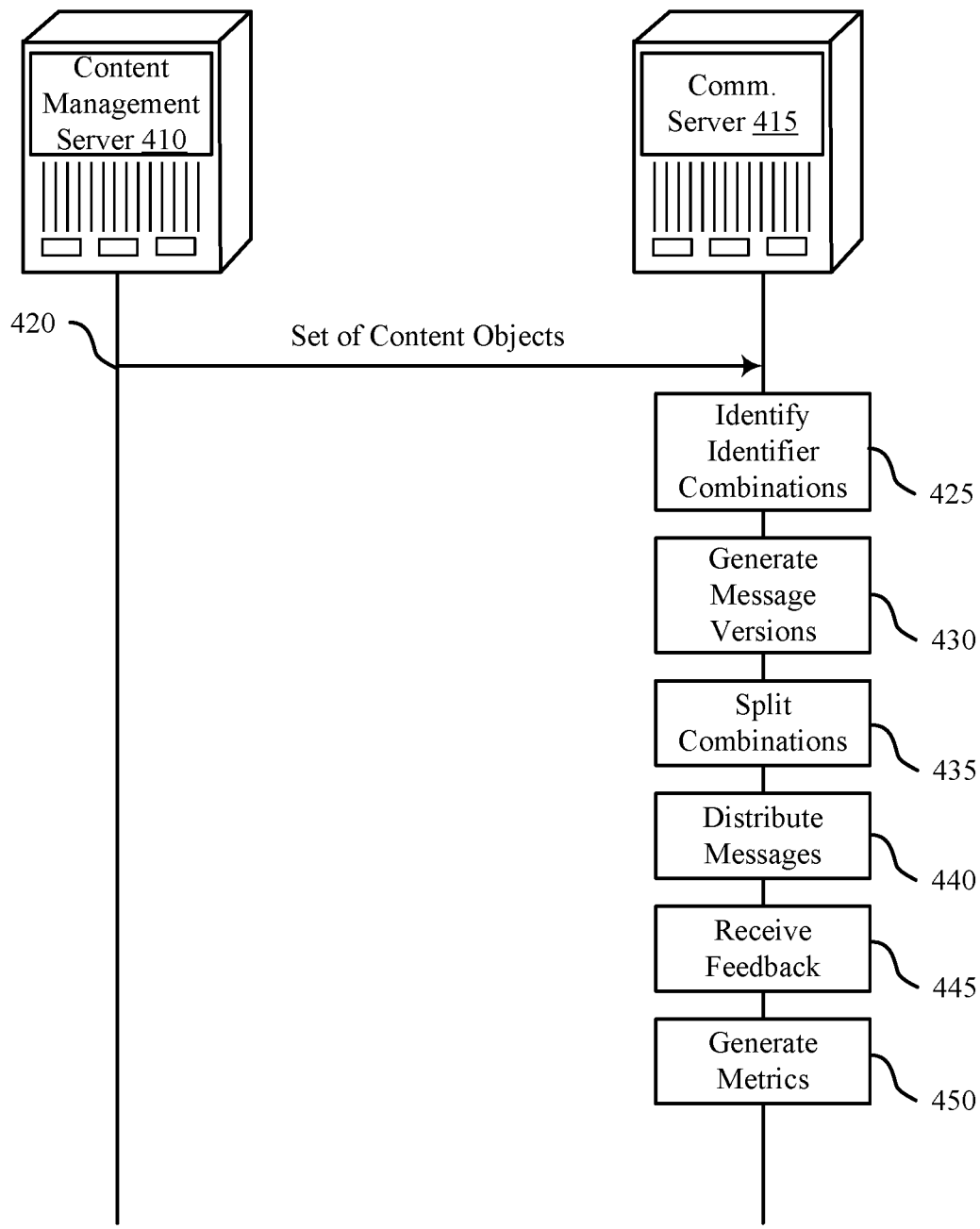
FIG. 4 illustrates an example of a process flow that illustrates variable content generation and engagement tracking in accordance with aspects of the present disclosure.

FIG. 4 illustrates an example of a process flow 400 that illustrates variable content generation and engagement tracking in accordance with aspects of the present disclosure. The process flow 400 includes a content management server 410, which may be an example of the first server 210 of FIG. 2, and a communication server, which may be an example of the second server 215 and 315 of FIGS. 2 through 3.

At 420, the communication server 415 receives a set of content objects from the content management server 410. In some cases, the set of content objects is received from a UI supported by the communication server 415. Each content object of the set of content objects may include a set of content data. At least one content object of the set of content objects includes at least a first version of content data and a second version of the content data. A set of target group identifiers is associated with a content object of the set of content objects. Each target group identifier is associated with a set of group class, and each user identifier of a collection of user identifiers is associated with one group for each group class based on attribute data associated with each user identifier.

At 425, the communication server 415 identifies a set of target group identifier combinations from the set of target group identifiers associated with the content object. Each combination of the set includes one target group identifier per group class of the set of group classes. Each combination may be associated with a set of user identifiers of the user collection.

At 430, the communication server 415 generates message versions including the different versions of the content data. Generation of the message may include populating a message object with content data. The message object may include HTML, or other markup language defining the visual or technical attributes of the messages, and the content may further define the attributes of the messages.

At 440, the communication server 415 distributes the communication message to a plurality of user identifiers associated with each target group identifier combination of the set of target group identifier combinations. The message includes content data from each content object of the set of content objects. For each combination of user identifiers, the communication server 415 distributes the first version of the message (including the first version of the content data) to a first portion of the user identifiers associated with the target group identifier combination, and the communication server 415 distributes the second version of the message (including the second version of the content data) to a second portion of the user identifiers associated with the target group identifier combination.

At 445, the communication server 415 receives feedback associated with the message distribution. The feedback may include indications of whether the users interacted with the received messages. Interaction may include whether the messages are clicked, opened, or unsubscribed.

At 450, the communication server 450 generates engagement metrics based on the feedback. The metrics may be generated for each version of the message and for each group of users and combination of groups.

Figure 5:
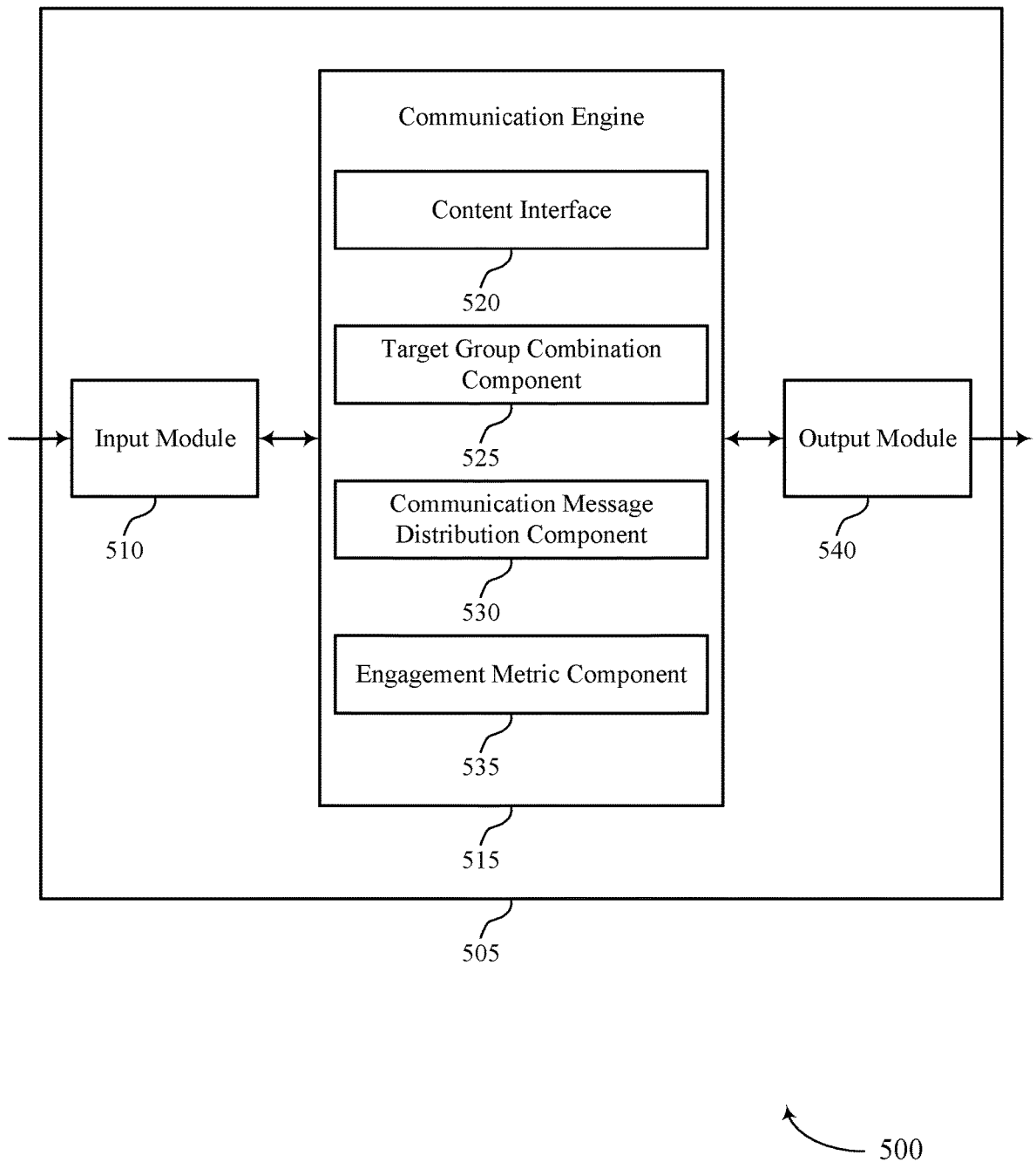
FIG. 5 shows a block diagram of an apparatus that supports variable content generation and engagement tracking in accordance with aspects of the present disclosure.

FIG. 5 shows a block diagram 500 of an apparatus 505 that supports variable content generation and engagement tracking in accordance with aspects of the present disclosure. The apparatus 505 may include an input module 510, a communication engine 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the communication engine 515 to support communication handling for data object stores. In some cases, the input module 510 may be a component of an input/output (I/O) controller 715 as described with reference to FIG. 7.

The communication engine 515 may include a content interface 520, a target group combination component 525, a communication message distribution component 530, and an engagement metric component 535. The communication engine 515 may be an example of aspects of the communication engine 605 or 710 described with reference to FIGS. 6 and 7.

The communication engine 515 and/or at least some of its various sub-components may be implemented in hardware, software executed by a processor, firmware, or any combination thereof. If implemented in software executed by a processor, the functions of the communication engine 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communication engine 515 and/or at least some of its various sub-components may be physically located at various positions, including being distributed such that portions of functions are implemented at different physical locations by one or more physical devices. In some examples, the communication engine 515 and/or at least some of its various sub-components may be a separate and distinct component in accordance with various aspects of the present disclosure. In other examples, the communication engine 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The content interface 520 may receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier.

The target group combination component 525 may identify a set of target group identifier combinations from the set of target group identifiers associated with the content object, each target group identifier combination of the set of target group identifier combinations including one target group identifier per group class of the set of group classes.

The communication message distribution component 530 may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data.

The engagement metric component 535 may generate a set of engagement metrics corresponding to interaction by the set of user identifiers with the communication message.

The output module 540 may manage output signals for the apparatus 505. For example, the output module 540 may receive signals from other components of the apparatus 505, such as the communication engine 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
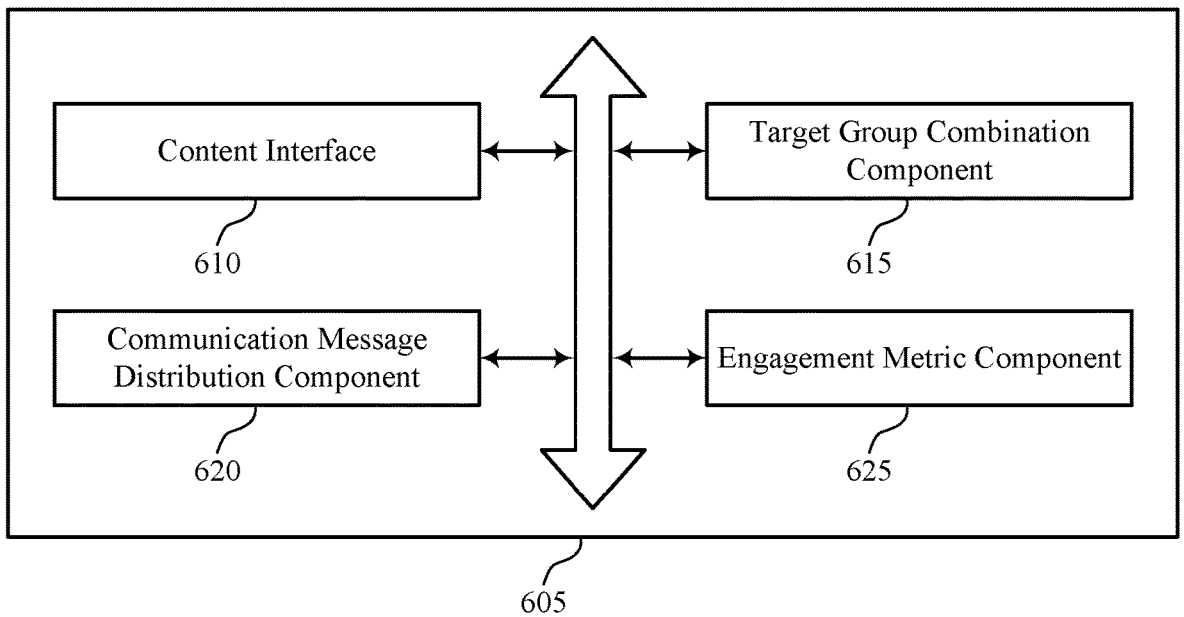
FIG. 6 shows a block diagram of a communication engine that supports variable content generation and engagement tracking in accordance with aspects of the present disclosure.

FIG. 6 shows a block diagram 600 of a communication engine 605 that supports variable content generation and engagement tracking in accordance with aspects of the present disclosure. The communication engine 605 may be an example of aspects of a communication engine 515 or a communication engine 710 described herein. The communication engine 605 may include a content interface 610, a target group combination component 615, a communication message distribution component 620, and an engagement metric component 625. Each of these modules may communicate, directly or indirectly, with one another (e.g., via one or more buses).

The content interface 610 may receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier. In some examples, the content interface 610 may associate a common task identifier with each content object of the set of content objects. In some examples, the content interface 610 may associate a unique content identifier with each content data of the set of content objects, where an engagement metric of the set of engagement metrics is generated for each unique content identifier corresponding to each content data included in the distributed communication message.

In some cases, the at least one content object of the set of content objects further includes a third version of the content data, a third portion of the set of user identifiers associated with the target group identifier combination receives the third version of the content data. In some cases, the set of content objects includes at least two content objects including content data variations, each content data variation of each of the at least two content objects being paired with each content data variation of other content objects of the at least two content objects in the communication message distribution. In some cases, the content data defines one or more attributes of the communication message. In some cases, the one or more attributes include a subject line, a preheader, one or more images, an alignment, one or more buttons, one or more colors, one or more links, or a combination thereof.

The target group combination component 615 may identify a set of target group identifier combinations from the set of target group identifiers associated with the content object, each target group identifier combination of the set of target group identifier combinations including one target group identifier per group class of the set of group classes.

In some examples, the target group combination component 615 may split, for each target group identifier combination of the set of target group identifier combinations, the set of user identifiers associated with the target group identifier combination into a number of portions based on a number of combinations of content data variations between the at least two content objects, each portion of the number of portions receiving a different content data variation in the communication message distribution. In some cases, a number of user identifiers for each portion of the number of portions is proportional.

The communication message distribution component 620 may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data. In some cases, the communication message includes an email.

The engagement metric component 625 may generate a set of engagement metrics corresponding to interaction by the set of user identifiers with the communication message. In some examples, the engagement metric component 625 may generate engagement metrics corresponding to the interaction of the set of user identifiers for each of the communication message including the first version of the content data, the communication message including the second version of the content data, and the communication message including the third version of the content data. In some examples, the engagement metric component 625 may associate the set of engagement metrics with the common task identifier. In some cases, the set of engagement metrics includes engagement metrics for each combination of target group identifiers of the set of target group identifiers, engagement metrics for each version of content data of the set of content objects, or a combination thereof. In some cases, the engagement metrics include an open rate, a click rate, a click to open rate, or a combination thereof.

Figure 7:
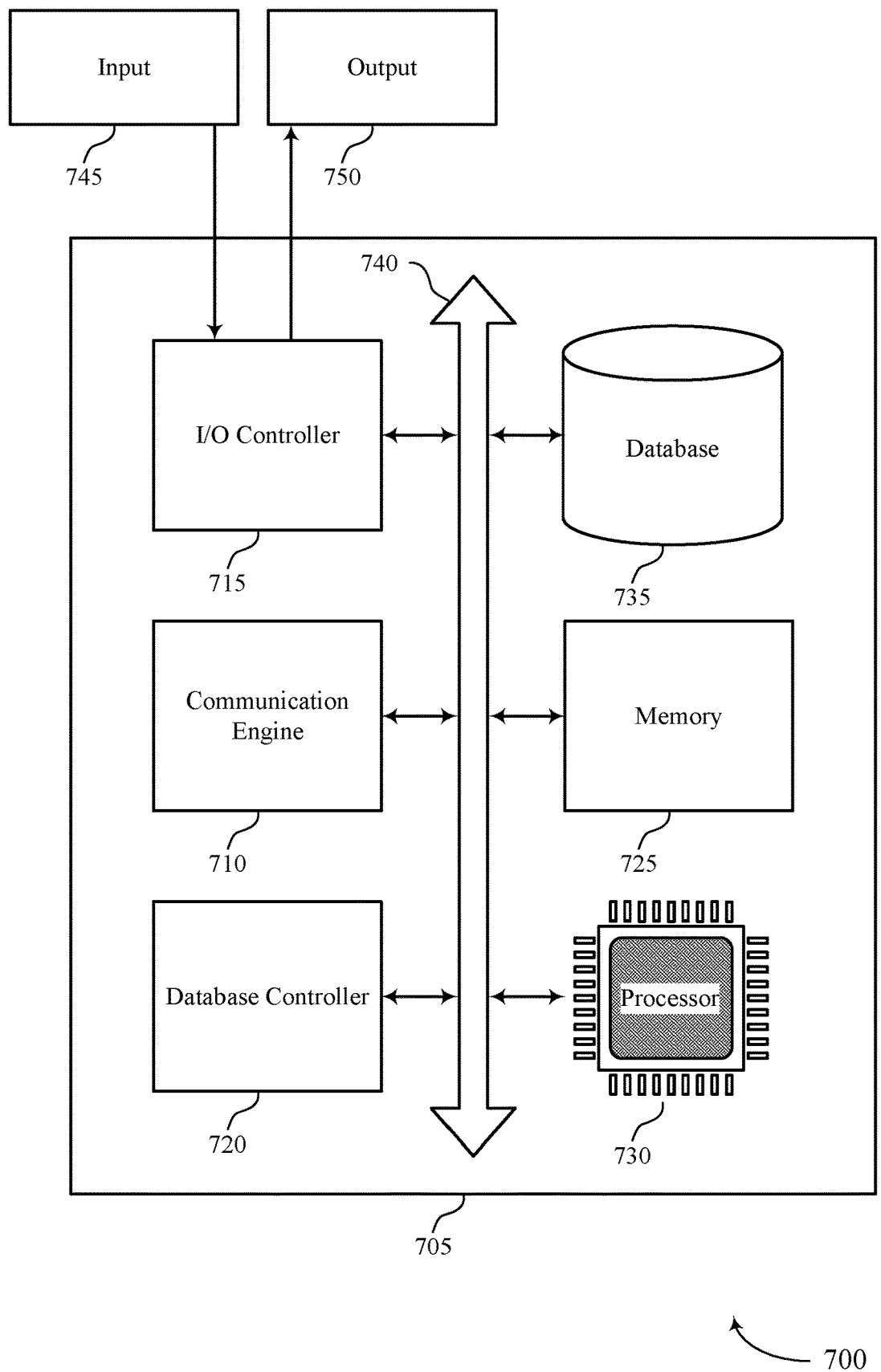
FIG. 7 shows a diagram of a system including a device that supports variable content generation and engagement tracking in accordance with aspects of the present disclosure.

FIG. 7 shows a diagram of a system 700 including a device 705 that supports variable content generation and engagement tracking in accordance with aspects of the present disclosure. The device 705 may be an example of or include the components of an application server or an apparatus 505 as described herein. The device 705 may include components for bi-directional data communications including components for transmitting and receiving communications, including a communication engine 710, an I/O controller 715, a database controller 720, memory 725, a processor 730, and a database 735. These components may be in electronic communication via one or more buses (e.g., bus 740).

The communication engine 710 may be an example of a communication engine 515 or 605 as described herein. For example, the communication engine 710 may perform any of the methods or processes described herein with reference to FIGS. 5 and 6. In some cases, the communication engine 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting variable content generation and engagement tracking).

Figure 8:
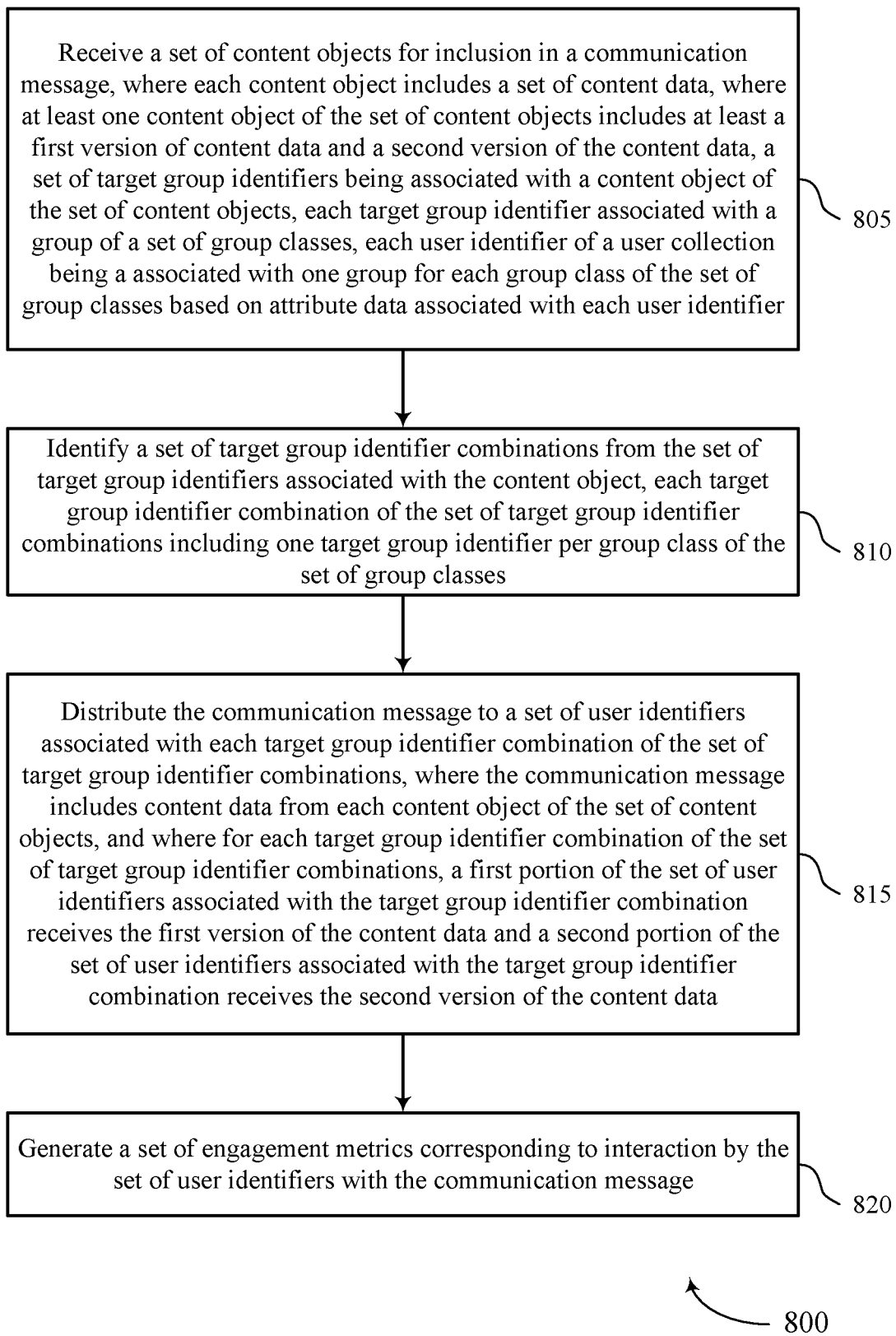
FIGS. 8 through 11 show flowcharts illustrating methods that support variable content generation and engagement tracking in accordance with aspects of the present disclosure.

FIG. 8 shows a flowchart illustrating a method 800 that supports variable content generation and engagement tracking in accordance with aspects of the present disclosure. The operations of method 800 may be implemented by an application server or its components as described herein. For example, the operations of method 800 may be performed by a communication engine as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 805, the application server may receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier. The operations of 805 may be performed according to the methods described herein. In some examples, aspects of the operations of 805 may be performed by a content interface as described with reference to FIGS. 5 through 7.

At 810, the application server may identify a set of target group identifier combinations from the set of target group identifiers associated with the content object, each target group identifier combination of the set of target group identifier combinations including one target group identifier per group class of the set of group classes. The operations of 810 may be performed according to the methods described herein. In some examples, aspects of the operations of 810 may be performed by a target group combination component as described with reference to FIGS. 5 through 7.

At 815, the application server may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data. The operations of 815 may be performed according to the methods described herein. In some examples, aspects of the operations of 815 may be performed by a communication message distribution component as described with reference to FIGS. 5 through 7.

At 820, the application server may generate a set of engagement metrics corresponding to interaction by the set of user identifiers with the communication message. The operations of 820 may be performed according to the methods described herein. In some examples, aspects of the operations of 820 may be performed by an engagement metric component as described with reference to FIGS. 5 through 7.

Figure 9:
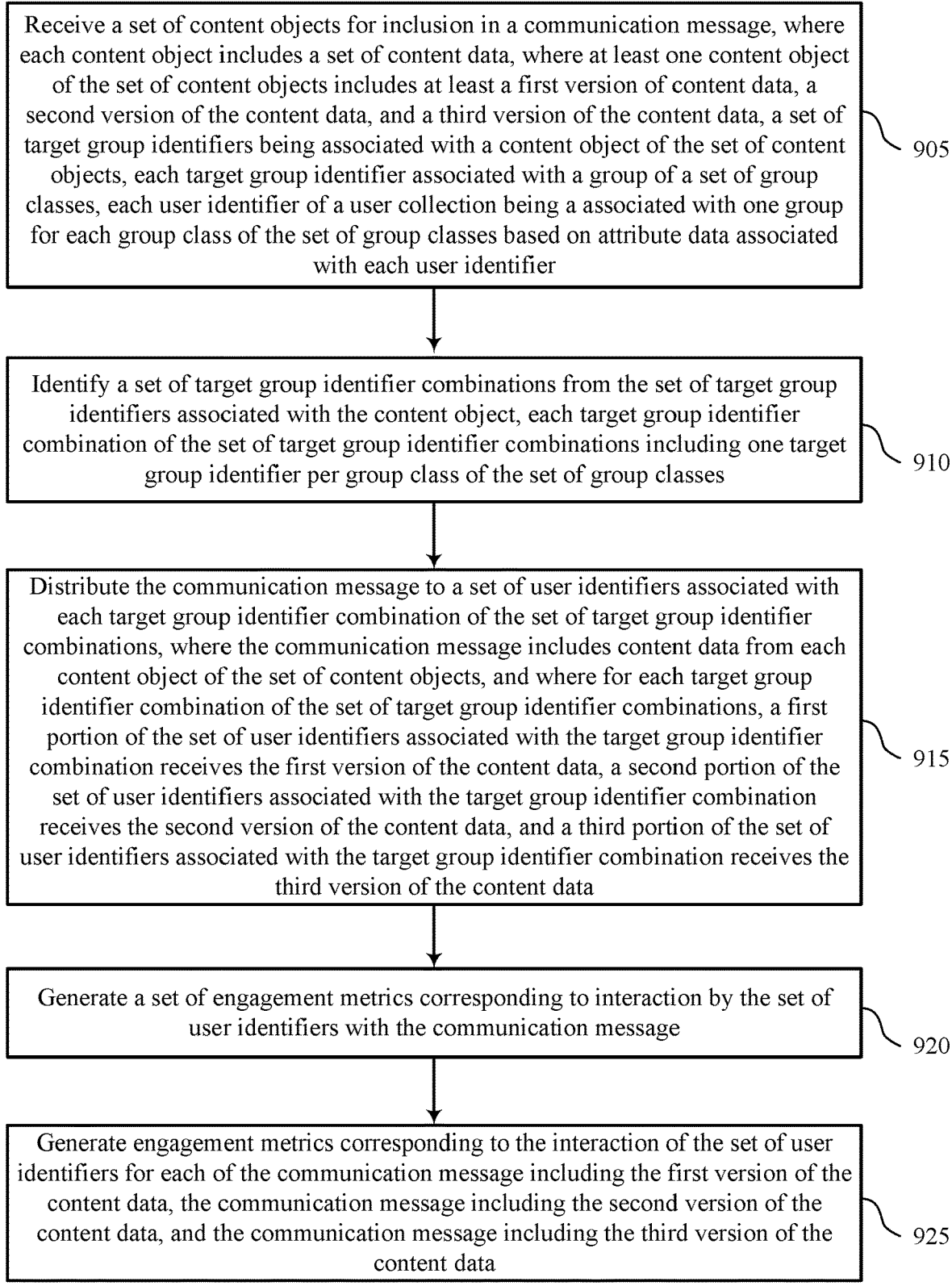

FIG. 9 shows a flowchart illustrating a method 900 that supports variable content generation and engagement tracking in accordance with aspects of the present disclosure. The operations of method 900 may be implemented by an application server or its components as described herein. For example, the operations of method 900 may be performed by a communication engine as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 905, the application server may receive a set of content objects for inclusion in a communication message, where each content object includes a set of content data, where at least one content object of the set of content objects includes at least a first version of content data, a second version of the content data, and a third version of the content data a set of target group identifiers being associated with a content object of the set of content objects, each target group identifier associated with a group of a set of group classes, each user identifier of a user collection being associated with one group for each group class of the set of group classes based on attribute data associated with each user identifier. The operations of 905 may be performed according to the methods described herein. In some examples, aspects of the operations of 905 may be performed by a content interface as described with reference to FIGS. 5 through 7.

At 910, the application server may identify a set of target group identifier combinations from the set of target group identifiers associated with the content object, each target group identifier combination of the set of target group identifier combinations including one target group identifier per group class of the set of group classes. The operations of 910 may be performed according to the methods described herein. In some examples, aspects of the operations of 910 may be performed by a target group combination component as described with reference to FIGS. 5 through 7.

At 915, the application server may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data, a second portion of the set of user identifiers associated with the target group identifier combination receives the second version of the content data, and a third portion of the set of user identifiers associated with the target group identifier combination receives the third version of the content data. The operations of 915 may be performed according to the methods described herein. In some examples, aspects of the operations of 915 may be performed by a communication message distribution component as described with reference to FIGS. 5 through 7.

At 920, the application server may generate a set of engagement metrics corresponding to interaction by the set of user identifiers with the communication message. The operations of 920 may be performed according to the methods described herein. In some examples, aspects of the operations of 920 may be performed by an engagement metric component as described with reference to FIGS. 5 through 7.

At 925, the application server may generate engagement metrics corresponding to the interaction of the set of user identifiers for each of the communication message including the first version of the content data, the communication message including the second version of the content data, and the communication message including the third version of the content data. The operations of 925 may be performed according to the methods described herein. In some examples, aspects of the operations of 925 may be performed by an engagement metric component as described with reference to FIGS. 5 through 7.

Figure 10:
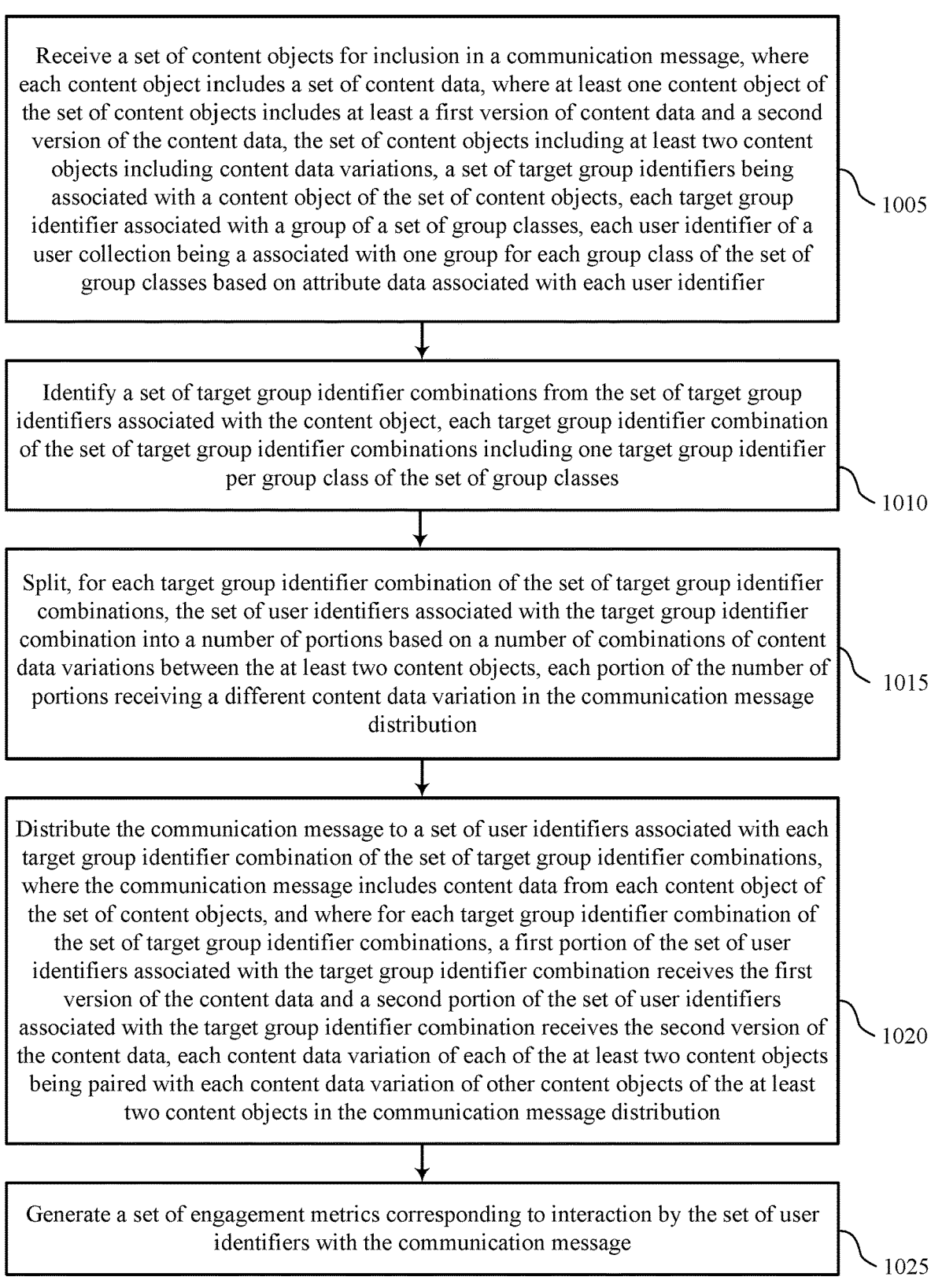

FIG. 10 shows a flowchart illustrating a method 1000 that supports variable content generation and engagement tracking in accordance with aspects of the present disclosure. The operations of method 1000 may be implemented by an application server or its components as described herein. For example, the operations of method 1000 may be performed by a communication engine as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1005, the application server may receive a set of content objects for inclusion in a communication message, where each content object includes a set of content data, where at least one content object of the set of content objects includes at least a first version of content data and a second version of the content data, the set of content objects including at least two content objects including content data variations, a set of target group identifiers being associated with a content object of the set of content objects, each target group identifier associated with a group of a set of group classes, each user identifier of a user collection being associated with one group for each group class of the set of group classes based on attribute data associated with each user identifier. The operations of 1005 may be performed according to the methods described herein. In some examples, aspects of the operations of 1005 may be performed by a content interface as described with reference to FIGS. 5 through 7.

At 1010, the application server may identify a set of target group identifier combinations from the set of target group identifiers associated with the content object, each target group identifier combination of the set of target group identifier combinations including one target group identifier per group class of the set of group classes. The operations of 1010 may be performed according to the methods described herein. In some examples, aspects of the operations of 1010 may be performed by a target group combination component as described with reference to FIGS. 5 through 7.

At 1015, the application server may split, for each target group identifier combination of the set of target group identifier combinations, the set of user identifiers associated with the target group identifier combination into a number of portions based on a number of combinations of content data variations between the at least two content objects, each portion of the number of portions receiving a different content data variation in the communication message distribution. The operations of 1015 may be performed according to the methods described herein. In some examples, aspects of the operations of 1015 may be performed by a target group combination component as described with reference to FIGS. 5 through 7.

At 1020, the application server may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data, each content data variation of each of the at least two content objects being paired with each content data variation of other content objects of the at least two content objects in the communication message distribution. The operations of 1020 may be performed according to the methods described herein. In some examples, aspects of the operations of 1020 may be performed by a communication message distribution component as described with reference to FIGS. 5 through 7.

At 1025, the application server may generate a set of engagement metrics corresponding to interaction by the set of user identifiers with the communication message. The operations of 1025 may be performed according to the methods described herein. In some examples, aspects of the operations of 1025 may be performed by an engagement metric component as described with reference to FIGS. 5 through 7.

Figure 11:
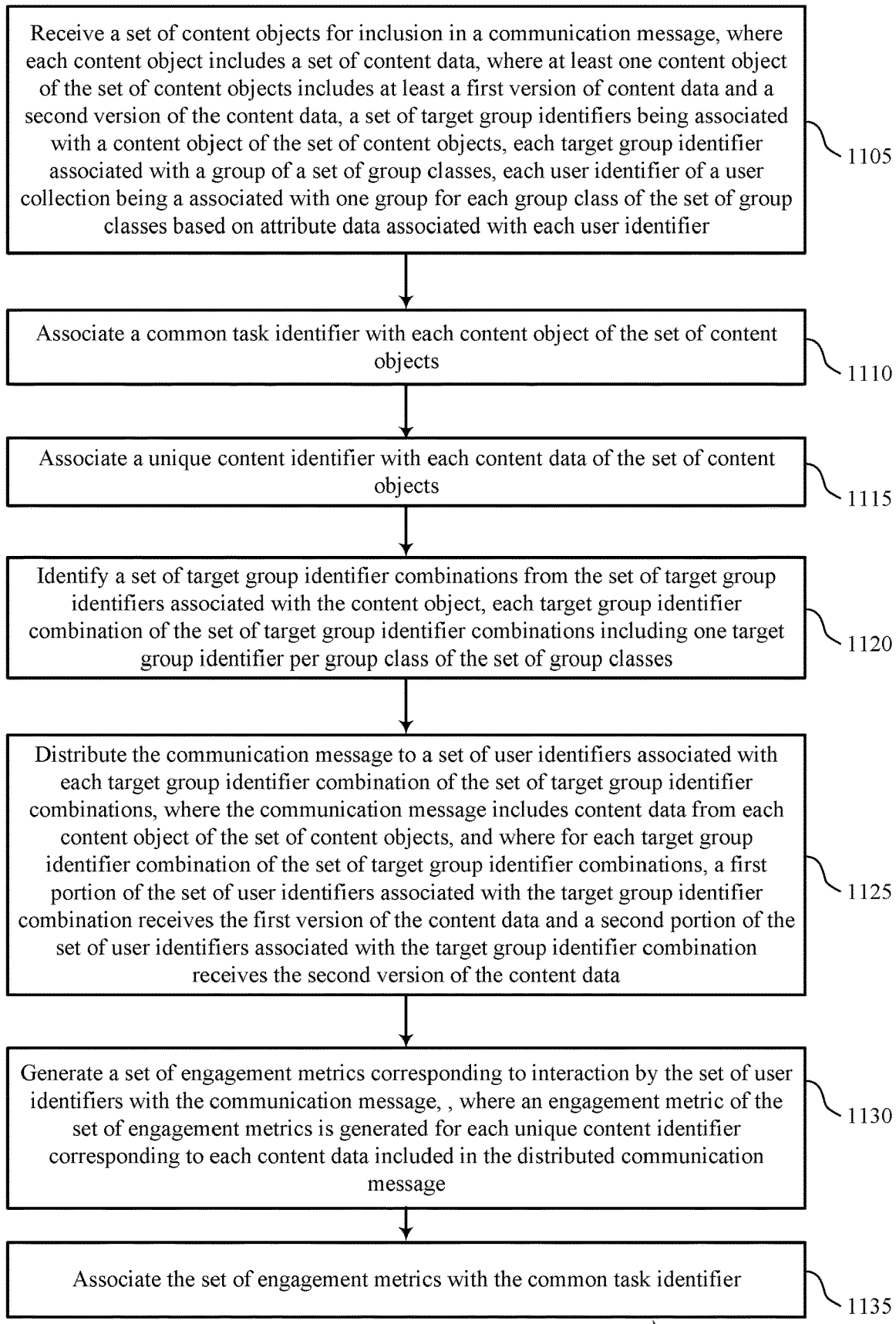

FIG. 11 shows a flowchart illustrating a method 1100 that supports variable content generation and engagement tracking in accordance with aspects of the present disclosure. The operations of method 1100 may be implemented by an application server or its components as described herein. For example, the operations of method 1100 may be performed by a communication engine as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1105, the application server may receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier. The operations of 1105 may be performed according to the methods described herein. In some examples, aspects of the operations of 1105 may be performed by a content interface as described with reference to FIGS. 5 through 7.

At 1110, the application server may associate a common task identifier with each content object of the set of content objects. The operations of 1110 may be performed according to the methods described herein. In some examples, aspects of the operations of 1110 may be performed by a content interface as described with reference to FIGS. 5 through 7.

At 1115, the application server may associate a unique content identifier with each content data of the set of content objects. The operations of 1115 may be performed according to the methods described herein. In some examples, aspects of the operations of 1115 may be performed by a content interface as described with reference to FIGS. 5 through 7.

At 1120, the application server may identify a set of target group identifier combinations from the set of target group identifiers associated with the content object, each target group identifier combination of the set of target group identifier combinations including one target group identifier per group class of the set of group classes. The operations of 1120 may be performed according to the methods described herein. In some examples, aspects of the operations of 1120 may be performed by a target group combination component as described with reference to FIGS. 5 through 7.

At 1125, the application server may distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data. The operations of 1125 may be performed according to the methods described herein. In some examples, aspects of the operations of 1125 may be performed by a communication message distribution component as described with reference to FIGS. 5 through 7.

At 1130, the application server may generate a set of engagement metrics corresponding to interaction by the set of user identifiers with the communication message, where an engagement metric of the set of engagement metrics is generated for each unique content identifier corresponding to each content data included in the distributed communication message. The operations of 1130 may be performed according to the methods described herein. In some examples, aspects of the operations of 1130 may be performed by an engagement metric component as described with reference to FIGS. 5 through 7.

At 1135, the application server may associate the set of engagement metrics with the common task identifier. The operations of 1135 may be performed according to the methods described herein. In some examples, aspects of the operations of 1135 may be performed by an engagement metric component as described with reference to FIGS. 5 through 7.

A method of data processing is described. The method may include receiving a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier, identifying a set of target group identifier combinations from the set of target group identifiers associated with the content object, each target group identifier combination of the set of target group identifier combinations including one target group identifier per group class of the set of group classes, distributing the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data, and generating a set of engagement metrics corresponding to interaction by the set of user identifiers with the communication message.

An apparatus for data processing is described. The apparatus may include a processor, memory in electronic communication with the processor, and instructions stored in the memory. The instructions may be executable by the processor to cause the apparatus to receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier, identify a set of target group identifier combinations from the set of target group identifiers associated with the content object, each target group identifier combination of the set of target group identifier combinations including one target group identifier per group class of the set of group classes, distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data, and generate a set of engagement metrics corresponding to interaction by the set of user identifiers with the communication message.

Another apparatus for data processing is described. The apparatus may include means for receiving a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier, identifying a set of target group identifier combinations from the set of target group identifiers associated with the content object, each target group identifier combination of the set of target group identifier combinations including one target group identifier per group class of the set of group classes, distributing the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data, and generating a set of engagement metrics corresponding to interaction by the set of user identifiers with the communication message.

A non-transitory computer-readable medium storing code for data processing is described. The code may include instructions executable by a processor to receive a set of content objects for inclusion in a communication message, where each content object includes a set of content data, where at least one content object of the set of content objects includes at least a first version of content data and a second version of the content data, a set of target group identifiers being associated with a content object of the set of content objects, each target group identifier associated with a group of a set of group classes, each user identifier of a user collection being associated with one group for each group class of the set of group classes based on attribute data associated with each user identifier, identify a set of target group identifier combinations from the set of target group identifiers associated with the content object, each target group identifier combination of the set of target group identifier combinations including one target group identifier per group class of the set of group classes, distribute the communication message to a set of user identifiers associated with each target group identifier combination of the set of target group identifier combinations, where the communication message includes content data from each content object of the set of content objects, and where for each target group identifier combination of the set of target group identifier combinations, a first portion of the set of user identifiers associated with the target group identifier combination receives the first version of the content data and a second portion of the set of user identifiers associated with the target group identifier combination receives the second version of the content data, and generate a set of engagement metrics corresponding to interaction by the set of user identifiers with the communication message.

In some examples of the method, apparatuses, and non-transitory computer-readable medium described herein, the at least one content object of the set of content objects further includes a third version of the content data, a third portion of the set of user identifiers associated with the target group identifier combination receives the third version of the content data.

Some examples of the method, apparatuses, and non-transitory computer-readable medium described herein may further include operations, features, means, or instructions for generating engagement metrics corresponding to the interaction of the set of user identifiers for each of the communication message including the first version of the content data, the communication message including the second version of the content data, and the communication message including the third version of the content data.

In some examples of the method, apparatuses, and non-transitory computer-readable medium described herein, the set of content objects includes at least two content objects including content data variations, each content data variation of each of the at least two content objects being paired with each content data variation of other content objects of the at least two content objects in the communication message distribution.

Some examples of the method, apparatuses, and non-transitory computer-readable medium described herein may further include operations, features, means, or instructions for splitting, for each target group identifier combination of the set of target group identifier combinations, the set of user identifiers associated with the target group identifier combination into a number of portions based on a number of combinations of content data variations between the at least two content objects, each portion of the number of portions receiving a different content data variation in the communication message distribution.

In some examples of the method, apparatuses, and non-transitory computer-readable medium described herein, a number of user identifiers for each portion of the number of portions may be proportional.

Some examples of the method, apparatuses, and non-transitory computer-readable medium described herein may further include operations, features, means, or instructions for associating a common task identifier with each content object of the set of content objects, and associating the set of engagement metrics with the common task identifier.

Some examples of the method, apparatuses, and non-transitory computer-readable medium described herein may further include operations, features, means, or instructions for associating a unique content identifier with each content data of the set of content objects, where an engagement metric of the set of engagement metrics may be generated for each unique content identifier corresponding to each content data included in the distributed communication message.

In some examples of the method, apparatuses, and non-transitory computer-readable medium described herein, the set of engagement metrics includes engagement metrics for each combination of target group identifiers of the set of target group identifiers, engagement metrics for each version of content data of the set of content objects, or a combination thereof.

In some examples of the method, apparatuses, and non-transitory computer-readable medium described herein, the engagement metrics include an open rate, a click rate, a click to open rate, or a combination thereof.

In some examples of the method, apparatuses, and non-transitory computer-readable medium described herein, the communication message includes an email.

In some examples of the method, apparatuses, and non-transitory computer-readable medium described herein, the content data defines one or more attributes of the communication message.

In some examples of the method, apparatuses, and non-transitory computer-readable medium described herein, the one or more attributes include a subject line, a preheader, one or more images, an alignment, one or more buttons, one or more colors, one or more links, or a combination thereof.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for content distribution, comprising:
receiving an indication of one or more content objects, a collection of user identifiers, and a plurality of data attributes associated with the collection of user identifiers, the collection of user identifiers and the plurality of data attributes being stored in a datastore, wherein each user identifier of the collection of user identifiers is associated with a respective segment identifier combination of a plurality of segment identifier combinations based at least in part on the plurality of data attributes and wherein each segment identifier combination of the plurality of segment identifier combinations comprises at least one segment identifier per segment class of a set of segment classes;
splitting each segment identifier combination of the collection of user identifiers received from the datastore into a first distribution group and a second distribution group based at least in part on the plurality of data attributes;
generating a first version of the one or more content objects and a second version of the one or more content objects;
transmitting, in accordance with an email distribution schedule, a first set of emails comprising the first version of the one or more content objects to a first plurality of user identifiers across the plurality of segment identifier combinations and that are in the first distribution group;
transmitting, in accordance with the email distribution schedule, a second set of emails comprising the second version of the one or more content objects to a second plurality of user identifiers across the plurality of segment identifier combinations and that are in the second distribution group; and
generating a first set of engagement metrics based at least in part on user interactions, by users in each segment identifier combination, with the first version of the one or more content objects and a second set of engagement metrics based at least in part on user interactions, by users in each segment identifier combination, with the second version of the one or more content objects.

2. The method of claim 1, further comprising:
receiving an indication of one or more target group identifiers that are associated with a group class of a set of group classes; and
determining a set of target group identifier combinations for the one or more target group identifiers using a rule indicating that a target group identifier combination is to have one target group identifier per group class of the set of group classes, wherein the first distribution group and the second distribution group are identified according to the set of target group identifier combinations.

3. The method of claim 1, wherein receiving the indication of the one or more content objects comprises:
receiving an indication of a first content item and a second content item for a first content object of the one or more content objects, wherein the first version includes the first content item for the first content object and the second version includes the second content item for the first content object.

4. The method of claim 1, wherein receiving the indication of the one or more content objects comprises:
receiving an indication of at least two content items for the one or more content objects.

5. The method of claim 4, further comprising:
determining a number of messages to generate based at least in part on a number of possible combinations of content items for the one or more content objects.

6. The method of claim 4, further comprising:
determining a number of user identifiers for each distribution group for transmission of a number of messages based at least in part on a number of possible combinations of content items for the one or more content objects.

7. The method of claim 1, wherein a number of user identifiers in the first plurality of user identifiers and a number of user identifiers in the second plurality of user identifiers is proportional.

8. The method of claim 1, wherein the first set of engagement metrics and the second set of engagement metrics comprise an open rate, a click rate, or a combination thereof.

9. The method of claim 1, wherein the first version, the second version, or both comprise an email.

10. An apparatus for content distribution, comprising:
one or more processors;
one or more memories coupled with the one or more processors; and
instructions stored in the one or more memories and executable by the one or more processors to cause the apparatus to:
receive an indication of one or more content objects, a collection of user identifiers, and a plurality of data attributes associated with the collection of user identifiers, the collection of user identifiers and the plurality of data attributes being stored in a datastore, wherein each user identifier of the collection of user identifiers is associated with a respective segment identifier combination of a plurality of segment identifier combinations based at least in part on the plurality of data attributes and wherein each segment identifier combination of the plurality of segment identifier combinations comprises at least one segment identifier per segment class of a set of segment classes;
split each segment identifier combination of the collection of user identifiers received from the datastore into a first distribution group and a second distribution group based at least in part on the plurality of data attributes;
generate a first version of the one or more content objects and a second version of the one or more content objects;
transmit, in accordance with an email distribution schedule, a first set of emails comprising the first version of the one or more content objects to a first plurality of user identifiers across the plurality of segment identifier combinations and that are in the first distribution group;
transmit, in accordance with the email distribution schedule, a second set of emails comprising the second version of the one or more content objects to a second plurality of user identifiers across the plurality of segment identifier combinations and that are in the second distribution group; and
generate a first set of engagement metrics based at least in part on user interactions, by users in each segment identifier combination, with the first version of the one or more content objects and a second set of engagement metrics based at least in part on user interactions, by users in each segment identifier combination, with the second version of the one or more content objects.

11. The apparatus of claim 10, wherein the instructions are further executable by the one or more processors to cause the apparatus to:

receive an indication of one or more target group identifiers that are associated with a group class of a set of group classes; and determine a set of target group identifier combinations for the one or more target group identifiers using a rule indicating that a target group identifier combination is to have one target group identifier per group class of the set of group classes, wherein the first distribution group and the second distribution group are identified according to the set of target group identifier combinations.

12. The apparatus of claim 10, wherein the instructions to receive the indication of the one or more content objects are executable by the one or more processors to cause the apparatus to:

receive an indication of a first content item and a second content item for a first content object of the one or more content objects, wherein the first version includes the first content item for the first content object and the second version includes the second content item for the first content object.

13. The apparatus of claim 10, wherein the instructions to receive the indication of the one or more content objects are executable by the one or more processors to cause the apparatus to:

receive an indication of at least two content items for the one or more content objects.

14. The apparatus of claim 13, wherein the instructions are further executable by the one or more processors to cause the apparatus to:

determine a number of messages to generate based at least in part on a number of possible combinations of content items for the one or more content objects.

15. The apparatus of claim 13, wherein the instructions are further executable by the one or more processors to cause the apparatus to:

determine a number of user identifiers for each distribution group for transmission of a number of messages based at least in part on a number of possible combinations of content items for the one or more content objects.

16. A non-transitory computer-readable medium storing code for content distribution, the code comprising instructions executable by a one or more processors to:

receive an indication of one or more content objects, a collection of user identifiers, and a plurality of data attributes associated with the collection of user identifiers, the collection of user identifiers and the plurality of data attributes being stored in a datastore, wherein each user identifier of the collection of user identifiers is associated with a respective segment identifier combination of a plurality of segment identifier combinations based at least in part on the plurality of data attributes and wherein each segment identifier combination of the plurality of segment identifier combinations comprises at least one segment identifier per segment class of a set of segment classes;

split each segment identifier combination of the collection of user identifiers received from the datastore into a first distribution group and a second distribution group based at least in part on the plurality of data attributes;

generate a first version of the one or more content objects and a second version of the one or more content objects;

transmit, in accordance with an email distribution schedule, a first set of emails comprising the first version of the one or more content objects to a first plurality of user identifiers across the plurality of segment identifier combinations and that are in the first distribution group and a second plurality of user identifiers in the second distribution group;

transmit, in accordance with the email distribution schedule, a second set of emails comprising the second version of the one or more content objects to a second plurality of user identifiers across the plurality of segment identifier combinations and that are in the second distribution group; and generate a first set of engagement metrics based at least in part on user interactions, by users in each segment identifier combination, with the first version of the one or more content objects and a second set of engagement metrics based at least in part on user interactions, by users in each segment identifier combination, with the second version of the one or more content objects.

17. The non-transitory computer-readable medium of claim 16, wherein the instructions are further executable by the one or more processors to:

receive an indication of one or more target group identifiers that are associated with a group class of a set of group classes; and determine a set of target group identifier combinations for the one or more target group identifiers using a rule indicating that a target group identifier combination is to have one target group identifier per group class of the set of group classes, wherein the first distribution group and the second distribution group are identified according to the set of target group identifier combinations.

18. The non-transitory computer-readable medium of claim 16, wherein the instructions to receive the indication of the one or more content objects are executable by the one or more processors to:

receive an indication of a first content item and a second content item for a first content object of the one or more content objects, wherein the first version includes the first content item for the first content object and the second version includes the second content item for the first content object.

19. The non-transitory computer-readable medium of claim 16, wherein the instructions to receive the indication of the one or more content objects are executable by the one or more processors to:

receive an indication of at least two content items for the one or more content objects.

20. The non-transitory computer-readable medium of claim 19, wherein the instructions are further executable by the one or more processors to:

determine a number of messages to generate based at least in part on a number of possible combinations of content items for the one or more content objects.

* * * * *